(12) United States Patent
Witkop et al.

(10) Patent No.: US 8,820,822 B2
(45) Date of Patent: Sep. 2, 2014

(54) WHEEL HOUSE LINER WITH HEMMED EDGE, AND SYSTEM AND METHOD OF MANUFACTURING THEREOF

(71) Applicant: GM Global Technology Operations LLC, Detroit, MI (US)

(72) Inventors: Wayne R. Witkop, Macomb, MI (US); Joseph C. Simmer, Richmond, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/761,445

(22) Filed: Feb. 7, 2013

(65) Prior Publication Data

US 2014/0217781 A1  Aug. 7, 2014

(51) Int. Cl.
  *B62D 25/18* (2006.01)
  *B62D 25/16* (2006.01)
  *B62D 65/12* (2006.01)

(52) U.S. Cl.
  CPC .............. *B62D 25/161* (2013.01); *B62D 65/12* (2013.01)
  USPC .......................................... 296/198; 280/850

(58) Field of Classification Search
  CPC ................................ B62D 25/16; B62D 25/18
  USPC ......................................... 296/198; 280/850
  See application file for complete search history.

(56) References Cited

U.S. PATENT DOCUMENTS

| | | | | | |
|---|---|---|---|---|---|
| 2,538,839 | A | * | 1/1951 | Limberg | 296/198 |
| 4,735,427 | A | * | 4/1988 | Fuchs | 296/198 |
| 5,340,154 | A | * | 8/1994 | Scott | 296/198 |
| 2007/0035157 | A1 | * | 2/2007 | Frank et al. | 296/187.02 |
| 2009/0139293 | A1 | * | 6/2009 | Kinouchi et al. | 72/220 |
| 2012/0291508 | A1 | * | 11/2012 | Hasegawa et al. | 72/214 |
| 2014/0001794 | A1 | * | 1/2014 | Hayakawa et al. | 296/198 |

FOREIGN PATENT DOCUMENTS

JP         2012-86777    *  5/2012

* cited by examiner

*Primary Examiner* — Jason S Morrow
(74) *Attorney, Agent, or Firm* — Quinn Law Group, PLLC

(57) ABSTRACT

A wheel house liner for a wheel house of a vehicle includes a main body and at least one flange along at least a portion of an end of the main body, the at least one flange forming a hemmed edge. The wheel house liner also includes a bonding agent to hold the at least one flange and the main body together, and at least one fastener hole. The main body is formed by a forming machine. The at least one flange is then formed by bending, by a bending tool, at least a portion of an end of the main body. The bonding agent may be applied to the portion of the end before or after the forming of the at least one flange. Finally, the hemmed edge is formed by folding, by the bending tool, the at least one flange against the main body.

4 Claims, 2 Drawing Sheets

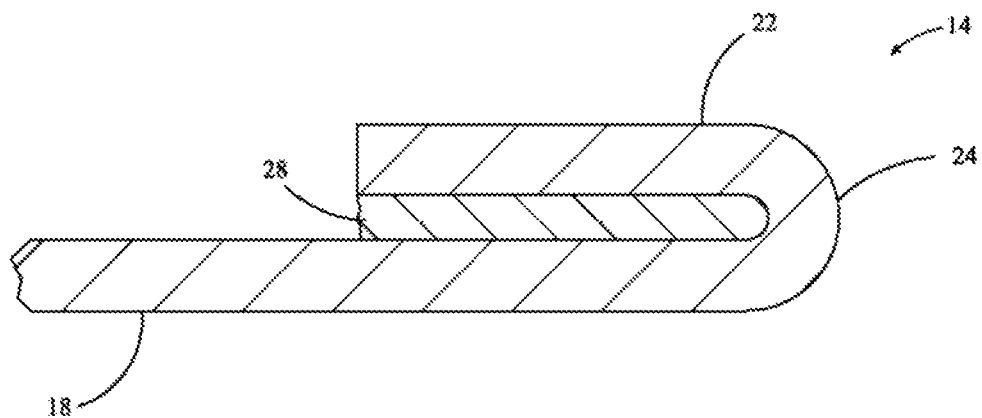
FIG. 3
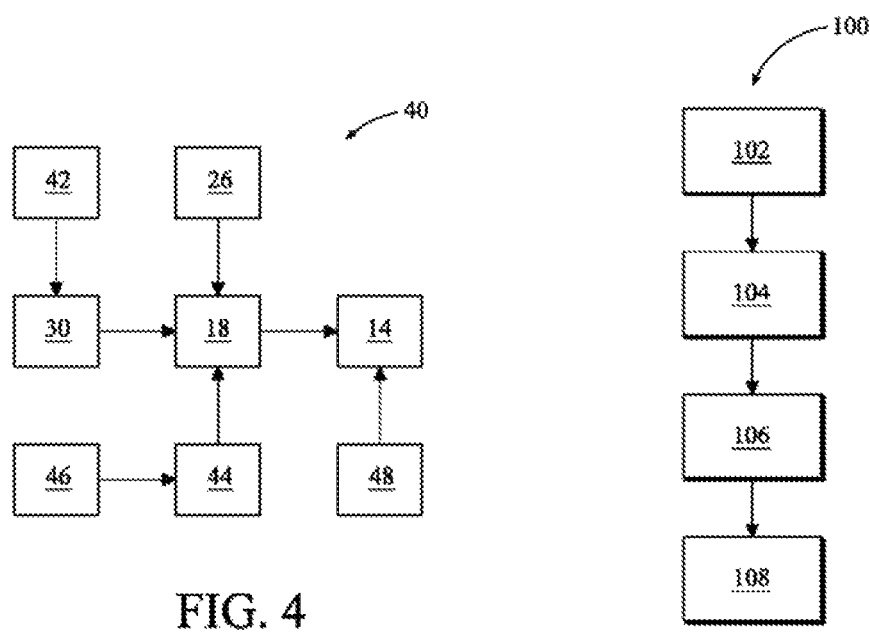
FIG. 4
FIG. 5

WHEEL HOUSE LINER WITH HEMMED EDGE, AND SYSTEM AND METHOD OF MANUFACTURING THEREOF

TECHNICAL FIELD

The present invention relates to a wheel house liner having a hemmed edge for a wheel house of a vehicle, and a system and method of manufacturing the wheel house liner thereof.

BACKGROUND

The wheels of a vehicle each are generally located in a wheel house of the vehicle. In a normal driving operation, the rotation of the wheels may stir up a large quantity of particles, such as rocks, dirt, snow, water, or the like, that may be projected against the wheel house shell. To protect against this, the vehicle may employ a wheel house liner at each wheel house location. In addition to serving as a barrier against projectiles caused by the rotating wheels, the wheel house liner may serve additional functions, including acoustical and aesthetical. As the wheel house liner is an actual barrier, it may dampen or block sounds generated from the interior and/or underbody of the vehicle from leaking to the ambient. Furthermore, the wheel house liner may block some of the more unsightly components and/or structure of the vehicle from being seen from the exterior of the vehicle. Some wheel house liners have an exterior edge exposed. Other vehicles include an additional molding to cover the edge such that it is not visible.

SUMMARY

A wheel house liner for a wheel house of a vehicle is provided. The wheel house liner includes a main body and at least one flange along at least a portion of an end of the main body. The wheel house liner may be made of a thermosetting plastic. The at least one flange is folded against the main body, forming a hemmed edge. The wheel house liner also includes a bonding agent to hold the at least one flange and the main body together. The bonding agent may also be a thermosetting plastic. The wheel house liner further includes at least one fastener hole through at least one of the main body and the at least one flange. The at least one fastener hole is configured to receive a fastener to mount the wheel house liner to the vehicle.

A method for manufacturing a wheel house liner with a hemmed edge is also provided. The wheel house liner may be as described above. The method includes first forming a main body of the wheel house liner from a sheet of material, which may be a thermosetting plastic. The method then includes applying a bonding agent to at least a portion of an end of the main body. The bonding agent may also be a thermosetting plastic. The method then includes bending at least a portion of the end of the main body to form at least one flange. The method finally includes folding the at least one flange against the main body to form a hemmed edge. The at least one flange and the main body are held together by the bonding agent.

A system for manufacturing a wheel house liner with a hemmed edge is further provided. Again, the wheel house liner may be as described above. The system includes a forming machine configured to form a main body of the wheel house liner from a sheet of material, which may be a thermosetting plastic. The system also includes a bending tool configured to bend at least a portion of an end of the main body to form at least one flange, and to fold the at least one flange against the main body to form the hemmed edge.

The system may also include a heating source to heat the bending tool to ease the bending and folding of the main body and at least one flange, respectively. The system may further include a hole punching device configured to punch at least one fastener hole in at least one of the main body and the at least one flange, the at least one fastener hole being configured to receive a fastener to mount the wheel house liner to the vehicle.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic, enlarged cross-sectional view of the wheel house liner of FIG. 2;

FIG. 4 is a schematic block diagram of a system configured to manufacture the wheel house liner of FIG. 2; and FIG. 5 is a schematic flow diagram illustrating a method of manufacturing the wheel house liner of FIG. 2.

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Figure 1:
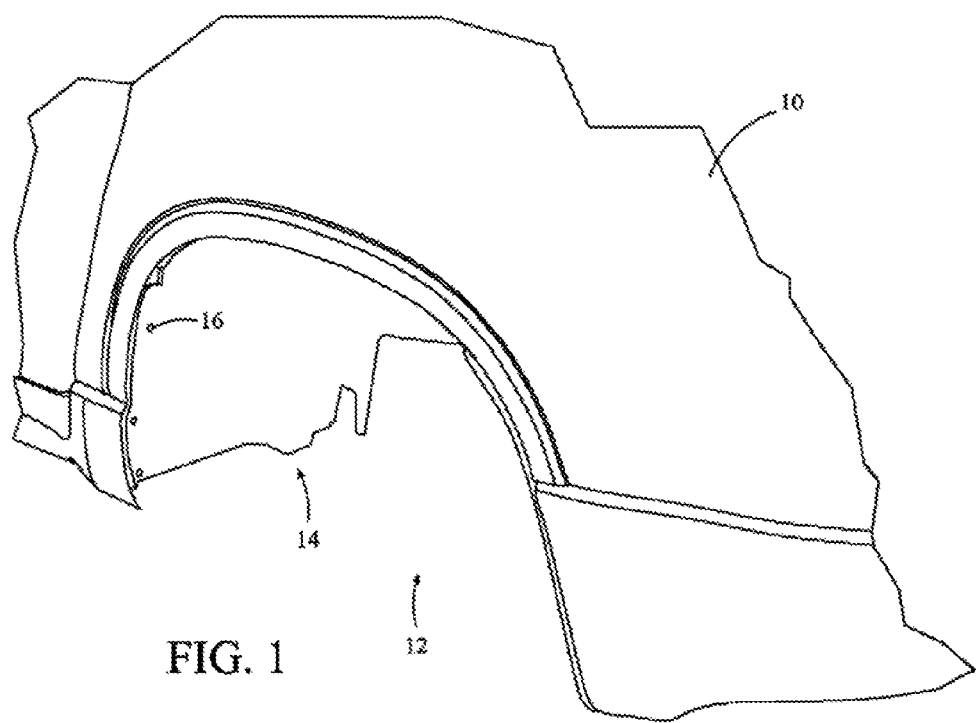
FIG. 1 is a schematic, fragmentary perspective view of a vehicle with a wheel house liner in a wheel house of the vehicle.

Referring to the drawings, wherein like reference numbers correspond to like or similar components wherever possible throughout the several figures, a vehicle 10 having a wheel house 12 is shown in FIG. 1. The vehicle 10 generally has a wheel house 12 at each location at which the vehicle 10 has a wheel (not shown). The vehicle 10 further has a wheel house liner 14 at the wheel house 12. The wheel house liner 14 is mounted to the vehicle 10 via fasteners 16.

Figure 2:
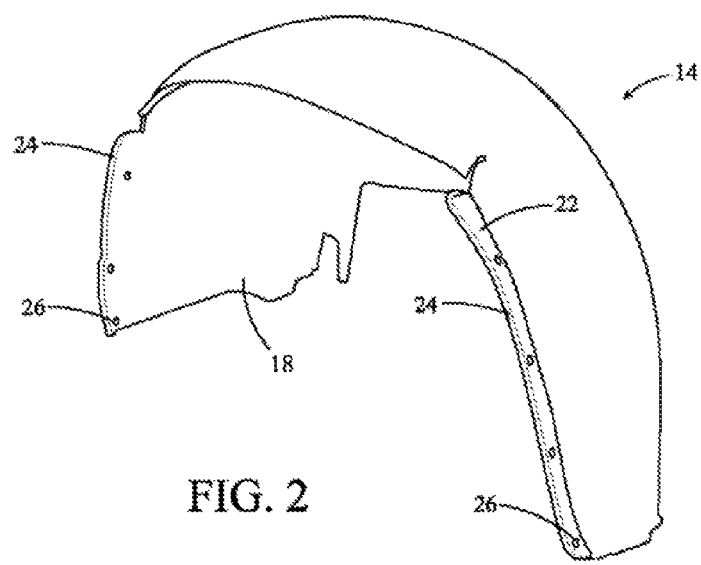
FIG. 2 is a schematic, perspective view of the wheel house liner of FIG. 1.

Referring now to FIG. 2, the wheel house liner 14 generally is shaped to match that of the wheel house 12. The wheel house liner 14 has a main body 18 and flanges 22 at an end of the main body 18. The end generally is along the edge of the wheel house 12, and which may be visible from the exterior of the vehicle 10.

The flanges 22 that are folded against the main body 18 such that they form hemmed edges 24, as depicted in more detail in FIG. 3. The flanges 22 are generally folded toward the vehicle 10 and away from the interior of the wheel house liner 14 such that the flanges 22 may not be visible after the wheel house liner 14 is mounted to the vehicle 10. The hemmed edges 24 may provide a smooth look and feel of the wheel house liner 14, thereby making it more aesthetically appealing. The hemmed edges 24 may further eliminate the need for an extra molding or other additional parts to serve the same or a similar purpose.

The wheel house liner 14 further includes fastener holes 26 configured to receive the fasteners 16 to mount the wheel house liner 14 to the vehicle 10 in the wheel house 12. The fastener holes 26 may be through the main body 18 and/or the flanges 22, depending on the location of the corresponding hole in the vehicle 10 and/or the size of the flanges 22.

Referring now to FIG. 3, an enlarged, cross-sectional view of the wheel house liner 14 at the end of the main body 18 is shown. As explained above, the flange 22 is folded against the main body 18, thereby forming the hemmed edge 24. In addition, the wheel house liner 14 also includes a bonding agent 28 to hold the flange 22 and the main body 18 together. The bonding agent 28 may be a thermosetting plastic.

Referring now to FIG. 4, a system 40 for manufacturing the wheel house liner 14, as described in method 100 hereinafter, is shown. The system 40 includes a forming machine 42 to form the main body 18 of the wheel house liner 14 from a sheet of material 30. The sheet of material 30 may be a thermosetting plastic, as explained above.

The system 40 also includes a bending tool 44 to bend the end of the main body 18 to form the flanges 22. The bending tool 44 may be, but is not limited to, a vice grip. The bending tool 44 may be made of, but is not limited to, steel, aluminum, or the like. The system 40 may also include a heating source 46 to heat the bending tool 44 to ease the bending process.

After the bonding agent 28 is applied to the end of the main body 18, as described in method 100 below, the bending tool 44 may bend the flanges 22 against the main body 18 to form the wheel house liner 14 in its final configuration with hemmed edges 24. As explained above, the bonding agent 28 holds together the main body 18 and the flanges 22.

The system 40 may further include a hole punching device 48 to punch the fastener holes 26 through the main body 18 and/or flanges 22. It should be appreciated that punching the fastener holes 26 may include, but is not limited to, punching, cutting, drilling, and the like.

Referring now to FIG. 5, a method 100 for manufacturing the wheel house liner 14 is shown. Method 100 begins at step 102 in which the main body 18 of the wheel house liner 14 is formed from the sheet of material 30 by the forming machine 42.

After step 102, method 100 proceeds to step 104. At step 104, the bonding agent 28 is applied to at least a portion of an end of the main body 18. As explained above, the bonding agent 28 may be a thermosetting plastic. The bonding agent 28 generally may be in liquid form so that it may be applied to the end of the main body 18.

After step 104, method 100 proceeds to step 106. At step 106, the end of the main body 18 is bent to form the flanges 22 by the bending tool 44. As explained above, the bending tool 44 may be, but is not limited to, a vice grip. Additionally, method 100 may include heating the bending tool 44 to a bending temperature via the heating source 46 to ease the bending of the end of the main body 18. In one embodiment, the bending temperature may be at least 400 degrees F. In another embodiment, the bending temperature may be between 400 degrees F. and 450 degrees F. It should be appreciated that steps 104 and 106 may be interchangeable.

After step 106, method 100 proceeds to step 108. At step 108, the flanges 22 are folded against the main body 18, thereby forming the hemmed edges 24. The flanges 22 are held to the main body 18 by the bonding agent 28. The bonding agent 28 may then be allowed to dry and solidify, thereby completing the bond between the main body 18 and the flanges 22.

Method 100 also may include flash freezing the flanges 18 and the end of the main body 18 with the bonding agent 28 to further the drying of the bonding agent 28. This may also limit bending back of the flanges 22, which may be particularly useful if there are tight tolerances between the wheel house liner 14 and the vehicle 10.

Method 100 may further include punching at least one fastener hole 26 through the body 18 and/or the flanges 22, depending on the location of the corresponding hole in the vehicle 10 and/or the size of the flanges 22. As explained above, punching the at least one fastener hole 26 may include, but is not limited to, punching, cutting, drilling, and the like.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A wheel house liner for a wheel house of a vehicle, the wheel house liner comprising:
   a main body,
   at least one flange along at least a portion of an end of the main body, the at least one flange forming a hemmed edge;
   a bonding agent to hold the at least one flange and the main body together; and
   at least one fastener hole through at least one of the main body and the at least one flange, the at least one fastener hole being configured to receive a fastener to mount the wheel house liner to the vehicle.

2. The wheel house liner of claim 1 wherein the main body is made of a thermosetting plastic.

3. The wheel house liner of claim 1 wherein the bonding agent is a thermosetting plastic.

4. The wheel house liner of claim 1 wherein the hemmed edge is rounded.

* * * * *